US005763559A

United States Patent [19]
Black

[11] Patent Number: 5,763,559
[45] Date of Patent: Jun. 9, 1998

[54] PHENOL-FORMALDEHYDE RESINS MODIFIED WITH GUANIDINE SALTS

[75] Inventor: Eric Peter Black, Covington, Ga.

[73] Assignee: Georgia-Pacific Resins, Inc., Atlanta, Ga.

[21] Appl. No.: 787,495

[22] Filed: Jan. 21, 1997

[51] Int. Cl.$^6$ .............................. C08G 8/04; C08L 61/10; C09J 161/10; B32B 21/08
[52] U.S. Cl. .................. 528/146; 524/594; 524/596; 525/504; 156/335; 428/528
[58] Field of Search .................. 525/504; 528/146, 528/256; 524/594, 595, 597; 428/528; 156/335

[56] References Cited

U.S. PATENT DOCUMENTS

| | | | |
|---|---|---|---|
| 4,206,095 | 6/1980 | Wynstra et al. | 528/137 |
| 4,501,628 | 2/1985 | McGuire et l. | 156/62.8 |
| 4,568,719 | 2/1986 | Tada et al. | 525/28 |
| 4,758,478 | 7/1988 | Daisy et al. | 428/529 |
| 5,110,898 | 5/1992 | Formaini | 528/256 |
| 5,340,903 | 8/1994 | Tetart et al. | 525/504 |
| 5,342,880 | 8/1994 | Chappelie | 524/594 |
| 5,344,874 | 9/1994 | Doi et al. | 524/593 |
| 5,505,998 | 4/1996 | Mathews et al. | 427/389.8 |
| 5,637,658 | 6/1997 | Teodorczyk | 525/504 |

*Primary Examiner*—Tae Yoon
*Attorney, Agent, or Firm*—Banner & Witcoff

[57] ABSTRACT

A guanidine-modified phenol-formaldehyde resole resin by reacting formaldehyde and phenol at a formaldehyde to phenol mole ratio above about 1.5:1 in the presence of an effective amount of an alkaline catalyst and in the presence of a catalytic amount of a guanidine salt. The resin is suitable for use in adhesives for high moisture content substrates.

25 Claims, 5 Drawing Sheets

PHENOL-FORMALDEHYDE RESINS MODIFIED WITH GUANIDINE SALTS

FIELD OF THE INVENTION

The present invention is directed to phenol-formaldehyde resins modified with guanidine salts for use as adhesives which exhibit high moisture content substrate bonding abilities over a wide range of conditions without sacrificing glue line dry out resistance.

BACKGROUND OF THE INVENTION

There are several types of adhesives which have been used, with varied success, to bind higher than average moisture content substrates (8% to 20% average moisture content), for example wood veneer. Such adhesives include AF/PF adhesives and foamed adhesives. Foamed adhesives are believed to have a slight advantage by their better ability to bond higher than average moisture content veneer at lower glue spread rates, thus limiting excess water in the glue line. The lesser amount of water at the glue line translates to less steam produced during hot pressing. This reduces the problem of veneer delaminations, or "blows," when the hot press opens due to the force of the steam pressure being greater than the cured adhesive strength of the glue. The AF/PF system acts as a catalyzed system and is designed to bond quickly before the steam pressure builds to a level at which the adhesive strength will not bind the veneer. These systems have associated disadvantages. The AF/PF system is prone to dry out on the glue line, requires the handling of two components, and has a finite shelf life following mixing of the two components. Foam glues are equipment specific resins and are not widely used currently in the plywood industry.

Recently, customers are demanding adhesives which will bond both normal and higher moisture content substrates, in order to increase throughput in their dryers and simultaneously reduce plant emissions. The sought-after adhesives must maintain several physical properties inherent to those currently used. These include a specific viscosity range, low free formaldehyde, etc. For example, proper application of the adhesive is dependent on viscosity, and changes to the adhesive which shift the viscosity range beyond the capability of the mill equipment is undesirable.

Further requirements for developing a superior adhesive which has the ability to bind varying, especially high moisture content substrates, include the ability to resist glue line dry out under varied conditions. Dry out is defined as the loss of moisture from the glue line which subsequently results in an ineffective adhesive. During the manufacture of wood products, there is a variable period of time between the lay up of the construction and the final thermal curing in the hot press. During this time the veneer often is subjected to conditions which tend to starve the glue line of moisture. Lower moisture content veneer and high temperature veneer can aggravate this phenomenon. The desired adhesive must be able to withstand the factors which contribute to dry out.

Past approaches to preparing a PF resin adhesive which can bond high moisture substrates have included increasing the resin molecular weight and/or the mole ratio in order to increase the cure speed or reduce the cure time of the PF adhesive. Both of these approaches reduce the dry out resistance of the resin and in the case of the higher mole ratio resins, increased formaldehyde emissions become a concern.

Therefore, there is a continuing need for a one-component resin with excellent storage stability, fast cure speeds to handle high moisture conditions, and low molecular weight to give dry out resistance, especially from extreme thermal conditions during prepress assembly.

SUMMARY OF THE INVENTION

The present invention is directed to the use of guanidine salts in preparing phenol-formaldehyde resin adhesives. Adhesives prepared from resins modified with guanidine salts are suitable for bonding high moisture content substrates, such as veneer and wood strands, and for forming quality bonds at shorter press times. Such adhesives also exhibit improved dry-out resistance.

An embodiment of the present invention is directed to a method for preparing a guanidine-modified phenol-formaldehyde resole resin composition by reacting formaldehyde and phenol at a formaldehyde to phenol mole ratio above about 1.5:1 in the presence of an effective amount of an alkaline catalyst and introducing a catalytic amount of a guanidine salt during the resin preparation.

The present invention is also directed to a guanidine-modified phenol-formaldehyde resin useful for preparing an adhesive, wherein the resin is prepared by reacting formaldehyde and phenol at a formaldehyde to phenol mole ratio above about 1.5:1, in the presence of an effective amount of an alkaline catalyst and introducing a catalytic amount of a guanidine salt during the resin preparation.

The present invention is also directed to a method for gluing high moisture content substrates by applying to the substrates an adhesive made from a guanidine-modified, phenol-formaldehyde resole resin.

The present invention is also directed to bonded wood products, such as plywood and OSB, prepared by applying to high moisture content substrates such as veneer or wood strands an adhesive made from a guanidine-modified, phenol-formaldehyde resole resin.

DETAILED DESCRIPTION OF THE INVENTION

Figure 1:
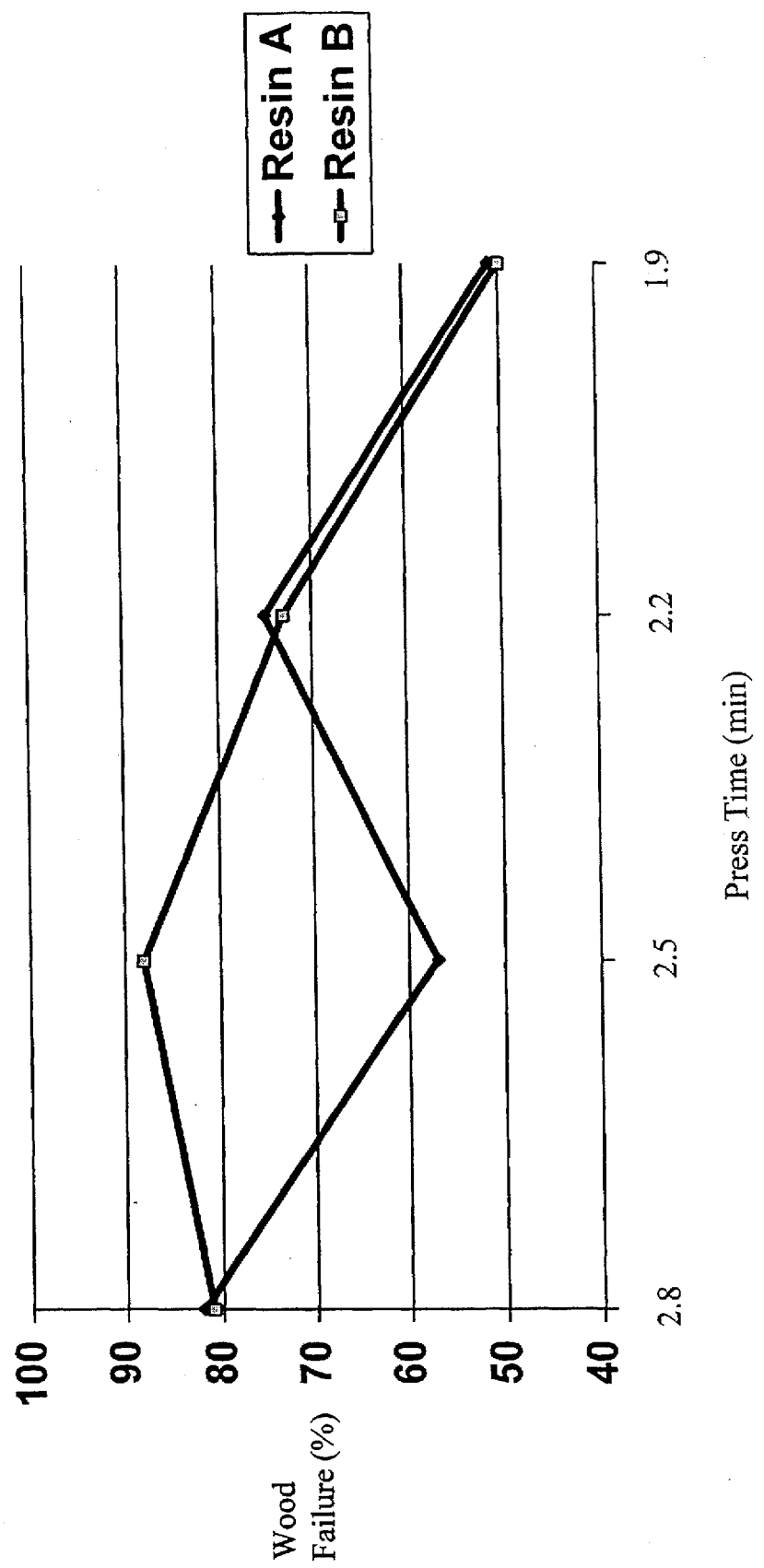
FIG. 1 depicts wood failure results for normal moisture content veneer press time study.

In accordance with the present invention, a guanidine salt is added during a phenol-formaldehyde resole resin cook to produce a guanidine-modified phenol-formaldehyde resole resin. Guanidine itself is an unstable material that readily hydrolyzes to urea. However, guanidine is stable as a salt, such as a salt of carbonic acid, e.g. guanidine carbonate.

It was discovered that phenol-formaldehyde resole resins modified with guanidine salts during the preparation of the resin are substantially less advanced at a given viscosity than similarly prepared unmodified phenol-formaldehyde resole resins and therefore the modified resins have good ability to resist dry out when the resin, applied to the glue line, is aged prior to hot pressing. In addition, these guanidine salt-modified resins bond (cure) quickly and thus have good press speed characteristics. In addition, guanidine salts react with excess formaldehyde in the resin during the resin preparation, reducing formaldehyde emissions.

As a result of its ability to enhance press speed, a guanidine-modified phenol-formaldehyde resole resin prepared according to the present invention is particularly suitable for use in preparing an adhesive for bonding high moisture content veneer (generally between 8% and 20% average moisture content). For example, adhesives made with phenol-formaldehyde resole resins modified with guanidine carbonate exhibited excellent press speeds even though the resins were cooked to a lower resin advancement than is normal for phenol-formaldehyde resole resins used for veneer and wood strand bonding applications. The resins of the present invention are suitable for bonding all types of lignocellulosic materials such as veneer, flakes, particles, strands, fibers, etc.

Suitable methods for preparing phenol-formaldehyde resole resins for use with the present invention may be found in, inter alia, U.S. Pat. No. 5,079,332 which is hereby incorporated by reference in its entirety. There are a variety of techniques known in the art for reacting phenol and formaldehyde in the presence of an alkaline catalyst. Typically, the resin is reacted in stages with separate partial additions of either one or both of the reactants and alkaline catalyst. For example, one common procedure is to react phenol with a portion of the formaldehyde, in the presence of a portion of the alkaline catalyst. After a brief, initial exothermic reaction, additional amounts of alkaline catalyst and formaldehyde are added to the reacting mixture and the reaction is continued with careful control of the reaction temperature. Once all of the reactants and catalyst have been added, the reaction is allowed to proceed to a suitable endpoint, which may be determined by measuring the refractive index of the reacting mixture or by measuring the viscosity of the reacting mixture or by some combination thereof as recognized by those skilled in the art. Once the selected end point is achieved, the reaction mixture is cooled and the resin is ready for preparing an adhesive mixture.

In accordance with the invention, an alkaline catalyzed resole resin composition is prepared by combining formaldehyde and phenol at a formaldehyde to phenol mole ratio of at least 1.5:1 and possibly up to 3:1, preferably in a range of about 2.0:1 to 2.5:1, and more preferably about 2.0:1 to 2.3:1, in an aqueous reaction media in the presence of an effective amount of a alkaline catalyst using known procedures. The pH during the reaction is preferably adapted to a value between about 9 and 12, and more preferably between about 10.5 and 11.5 using the alkaline catalyst.

Once the phenol and formaldehyde has been combined, the resin is heated to a temperature whereupon controllable viscosity advancement is achieved. The resin is heated to advance the resin to the desired viscosity, typically between about 500 and 1100 cps and then cooled to room temperature. The viscosity is typically measured by a Brookfield viscometer such as Model LVF spindle 2 or 3, speed 30.

In accordance with the present invention, a guanidine salt is added as an additional catalyst to the resin at any time during the resin preparation. However, it is preferable to add the guanidine salt at a point between the time after substantially all of the formaldehyde has been added during the synthesis and the end of the resin cook just prior to cooling the resin composition. More preferably, the guanidine salt is added immediately after all of the formaldehyde has been added to the reaction mixture.

The guanidine salt is added in a catalytic amount sufficient to obtain the desired final resin viscosity and degree of resin advancement. Typically the guanidine salt is added to the resin in an amount between about 0.02 and 12 wt %, preferably between about 0.2 and 5 wt %, more preferably between about 1 and 2.5 wt %, based on the total weight of the resin solids.

The guanidine salt may be any suitable salt including guanidine carbonate, guanidine hydrochloride, guanidine sulfate, etc. and low molecular weight guanidine adducts with formaldehyde. Other sources of guanidine salts include, but are not limited to, methyl guanidine and ethyl guanidine derivatives. Preferably, the guanidine salt is guanidine carbonate.

As used herein, phenol-formaldehyde resole resin includes reaction products of a phenol and formaldehyde having reactive methylol groups. The solids level of the final resin is preferably about 30 to 75% by wt and depends on the ultimate use of the resin. For example, resins for use in preparing an adhesive for making plywood, preferably have a solids level of about 40 to 50% by wt, whereas resins for use in preparing an adhesive for making oriented strand board preferably have a solids level of about 50 to 60% by wt.

As well known to those of skill in the art, a suitable alkaline catalyst is added during the resin cook. Preferably, part of the catalyst is added at the beginning of the cook, and the rest is added during the cook. The catalyst promotes the reaction of the formaldehyde with phenol to form a resole resin. The catalyst is preferably one of the inorganic or organic alkaline catalysts known to be useful in preparing phenol-formaldehyde resole resins. The catalyst is present in an amount effective to catalyze the reaction between the phenol and formaldehyde. The catalyst generally provides 1 to 15 wt %, often about 4 to 8 wt %, more usually about 6 wt %, of the final weight of the resin. Typical catalysts include alkali metal hydroxides, such as sodium hydroxide, lithium hydroxide, potassium hydroxide, or mixtures thereof, generally sodium hydroxide is preferred for cost and availability. Other catalysts include alkali metal carbonates such as sodium carbonate and potassium carbonate, alkaline earth hydroxides such as magnesium hydroxide, calcium hydroxide and barium hydroxide, aqueous ammonia and amines.

In a preferred embodiment of the present invention, guanidine carbonate is added during the cook of a 2.0:1 to 2.3:1 molar ratio formaldehyde-phenol resole resin after all of the formaldehyde has been added during the synthesis. The resin is catalyzed by sodium hydroxide and heated to a temperature whereupon controllable viscosity advancement is achieved. The cook is ended by cooling when the desired application viscosity has been reached.

Urea also may be added during the resin cook. Typically, urea is used as a formaldehyde scavenger. However, urea may not be desirable because it counteracts the desired lower molecular weight of the resin and reduces the dry out resistance. That is, urea has a thinning effect and to achieve a given viscosity requires a relatively higher molecular weight resin. Urea is available in many forms such as solid urea, for example prill, and urea solutions, typically aqueous solutions. Any form of urea is suitable for use in the practice of the invention. The urea is generally added between about 0 and 3 wt %, preferably above about 0.5 wt %.

Formaldehyde is also available in many forms. Paraform (a solid, polymerized formaldehyde) and formalin solutions (aqueous solutions of formaldehyde, sometimes with methanol, in 37%, 44%, or 50% formaldehyde concentrations) are commonly used forms. Formaldehyde also is available as a gas. Any of these forms is suitable for use in the practice of the invention. Further, the formaldehyde may be partially or totally replaced with any suitable aldehyde as known in the art. Typically, formalin solutions low in methanol are preferred as the formaldehyde source.

The phenol component of the resole resin includes any phenol typically used in preparing phenolic resole resins, which are not substituted at either the two ortho positions or at one ortho and the para position, such unsubstituted positions being necessary for the desired polymerization reaction to occur. Phenols substituted in these positions may be used in lesser quantities (e.g., up to about 30 weight % of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof. Furthermore, at least a portion of the phenol component must include a phenol not blocked at the ortho and para positions so that the resin is thermosettable. Preferably, at least 10% by weight of the phenol component should include such tri-functional phenol and usually the phenol component consists essentially entirely of such tri-functional phenol.

Substituted phenols which optionally can be employed in the formation of the phenolic resins include alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and usually from 1 to 9, carbon atoms.

Specific examples of suitable phenols for preparing the resole resin composition of the present invention include: hydroxy benzene (phenol), o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol and substituted derivatives thereof. Ordinary phenol (hydroxy benzene) normally is preferred for most applications based on cost and availability.

During the process of preparing the resole resins of the present invention, a variety of other modifiers can be added into the resole resin in order to improve toughness and other cured resin properties. These modifiers include, for example, chain terminating phenols, glycols, with or without halogen substitution for additional fire retardancy, polyester polyols, alkyl phenols, hydroxy-containing acrylates, and the like and mixtures thereof. The proportion of such modifiers incorporated into the resole resin typically ranges from 5 to 35 weight percent (based on the phenol component.)

Other modifiers such as fire retardants, lubricants, defoamers, plasticizers, softening agents, pigments and fillers also can be added to the resole resin composition. Reactive modifiers such as di- and higher polyols, e.g., di- or polyhydric phenols, resorcinol, phloroglucinol, and the like, can be added to the resole resin after it has been formulated. Finally, modifiers to achieve special effects in particular applications may be appropriate, e.g., polyvinyl butyrals, or epoxies for better impact strength in composites.

The present invention is also directed to processes of bonding high moisture content substrates using a guanidine-modified phenol-formaldehyde resin in a suitable adhesive composition, and the resulting bonded products. The adhesive is applied to the substrate materials by any suitable method and then the substrate materials are hot pressed to form a bonded wood product or composite. Suitable substrate materials include, but are not limited to, wood plies, composite panels, veneer, particles, flakes, sawdust, meal, flour, and fibers.

The present invention is particularly useful for bonding high moisture content substrates for example having an overall average moisture content of about 5 to 20 wt %. The present invention may also be used with wood stock having an average moisture content of about 8 to 20 wt %, but containing a substantial amount of stock having a moisture content below about 3% by wt. The moisture content is determined by means known in the art such as taking an average value of a number of sample readings. ASTM D2016-74 provides a preferred method for determining the moisture content of a substrate. Determining average moisture is within the skill of the art.

An adhesive containing a resin in accordance with the present invention may be applied to a substrate in any suitable manner such as with spray nozzles, atomizing wheels, roll coaters, curtain coaters, and foam applicators. Typically the adhesive is applied to the substrate immediately or fairly shortly before hot pressing. An advantage of the present invention is that the adhesive may be applied even up to about 60 minutes prior to hot pressing with significantly less dry out problems than prior art adhesives. Descriptions of how to make bonded wood products or composites such as plywood, particleboard, hardboard, fiberboard, oriented strand board and the like may be found in U.S. Pat. No. 4,758,478. U.S Pat. No. 5,079,332, incorporated by reference above, provides a description of making plywood.

The amount of adhesive applied to the substrate depends on the nature of the substrate, and the desired quality of the final product, and is usually between 3 and 8 wt % dry resin solids based on the finished product. Suitable amounts are also provided in U.S. Pat. Nos. 4,758,478 and 5,079,332.

EXAMPLES

The invention will be further described by reference to the following examples. These examples should not be construed in any way as limiting the invention to anything less than that which is disclosed or which would have been obvious to anyone skilled in the art.

Example 1

Due to the exothermic nature of the reaction used to produce resoles, reagents are added to initiate and fuel the polymerization in quantities which allow the reaction to remain under control. Therefore, with the exception of phenol and water, fractional proportions of the remaining reagents generally are added stepwise to ensure the safety of the person preparing the resin and the equipment. The following ingredients were combined in the following order.

| Resin Ingredients | |
| --- | --- |
| Component | Weight % |
| Phenol | 24 |
| 50% CH$_2$O | 12 |
| Water | 27 |
| 50% NaOH | 6 |
| 50% CH$_2$O | 23 |
| Guanidine Carbonate | 2 |
| 50% NaOH | 6 |

Phenol, formaldehyde and water were charged to a reactor and the temperature was adjusted to 37° C. Sodium hydroxide solution was added and the temperature was allowed to increase to 82° C. The second charge of formaldehyde was added incrementally, in order to maintain control of the reaction. The reaction contents were then heated to 96° C. and held at that temperature for 30 minutes. The contents were cooled to 82° C. and reacted to 1020 cps as measured on a Brookfield viscometer (model LVF). During the viscosity hold to 1020 cps the remaining ingredients, including guanidine carbonate, were added incrementally. The resulting product contained 43% solids.

Example 2

A guanidine carbonate resin was prepared and examined for its ability to bond both normal moisture content veneer and high moisture content veneer, and for its resistance to drying out during varying open assembly times. Resin A (control) was a commercially available IMC (intermediate moisture content) veneer bonding adhesive sold as GP RPPY 5777. Resin B was a 2.3 mole ratio resin cooked with 2% guanidine carbonate added after all the formaldehyde was added in accordance with Example 1.

TABLE 1

| Properties for the Resins | | | | | |
| --- | --- | --- | --- | --- | --- |
| Resin | % Caustic | Viscosity (cps) | RI | % NVS | Free Formaldehyde |
| A | 6.66 | 650 | 1.4618 | 42.7 | negligible |
| B | 6.60 | 1020 | 1.4663 | 42.9 | * |

*Unable to do this test due to test method interference from methylolated guanidine carbonate. There was no noticeable formaldehyde odor.

TABLE 2

| Resin | M$_n$ | M$_w$ | M$_z$ |
| --- | --- | --- | --- |
| A | 751 | 2060 | 4340 |
| B | 452 | 1050 | 2254 |

Surprisingly, Resin B had a lower molecular weight at a higher resin viscosity.

The resins were incorporated into a RESI-MIX® (mixed adhesive) formulation listed in Table 3.

TABLE 3

| RESI-MIX ® Formulation | |
| --- | --- |
| Component | Amount, % |
| Water | 14.3 |
| CO-COB ® filler | 6.8 |
| SPRAY-X ® extender | 6.9 |
| 50% NaOH | 3.1 |
| Soda Ash | 0 |
| Resin | 68.9 |
| Target Total Dry Solids | 43.5 |
| Target Resin Solids | 29.6 |
| Target Viscosity | 2200 |
| Filler/Extender Ratio | 1 |

The mixes were aged overnight and used in a press speed and high moisture study. An open assembly time study was run the following day. Details of the conditions used for these studies are listed in Table 4.

TABLE 4

| Condition for the Panel Studies | | | |
| --- | --- | --- | --- |
| | Press Speed Study | Dry Out Study | High Moisture Study |
| Veneer | ⅛" thick southern yellow pine 12" × 12" | ⅛" thick southern yellow pine 12" × 12" | ⅛" thick southern yellow pine 12" × 12" |
| Face/Back Average Moisture Content | 8–10% | 6–8% | 11–13% |
| Core Average Moisture Content | 6–8% | 6–8% | 9–11% |
| Panel Construction | 3-ply, ⅜" thick, 12" × 12" | 3-ply, ⅜" thick, 12" × 12" | 3-ply, ⅜" thick, 12" × 12" |
| Glue Spreads | 31–33 g/ft$^2$, 73 lbs. MDGL Equivalent | 31–33 g/ft$^2$, 73 lbs. MDGL Equivalent | 31–33 g/ft$^2$, 73 lbs. MDGL Equivalent |
| Lay-up | 4 panels per each 2 min., 4 panels per condition | 4 panels per each 2 min., 4 panels per condition | 4 panels per each 2 min., 4 panels per condition |
| Open Assembly Time | 15 minutes | Variable 60,90,120,150, 180 minutes (in open racks) | 15 minutes |
| Prepress | 4 minutes at 150 psi | None | 4 minutes at 150 psi |
| Closed Assembly Time | Negligible | Negligible | Negligible |
| Hot Press | Variable 1.9, 2.2, 2.5, 2.8 minutes | 3 minutes | Variable 1.9, 2.2, 2.5, 2.8 minutes |
| Hot Stack Test | Overnight APA Vacuum/ Pressure 8 chips per panel | Overnight APA Vacuum/ Pressure 8 chips per panel | Overnight APA Vacuum/ Pressure 8 chips per panel |

Results for the press time study are listed in Table 5 and detailed in FIG. 1.

TABLE 5

Results for the Press Time Study

| | Press Time | | | | | Average Wood Failure Results | 95% Interval Range | |
|---|---|---|---|---|---|---|---|---|
| Resin | 1.9 | 2.2 | 2.5 | 2.8 | Average | Lower Limit | Upper Limit |
| A | 51 | 75 | 57 | 82 | 66 | 62 | 71 |
| B | 50 | 73 | 88 | 81 | 72 | 68 | 77 |

Figure 2:
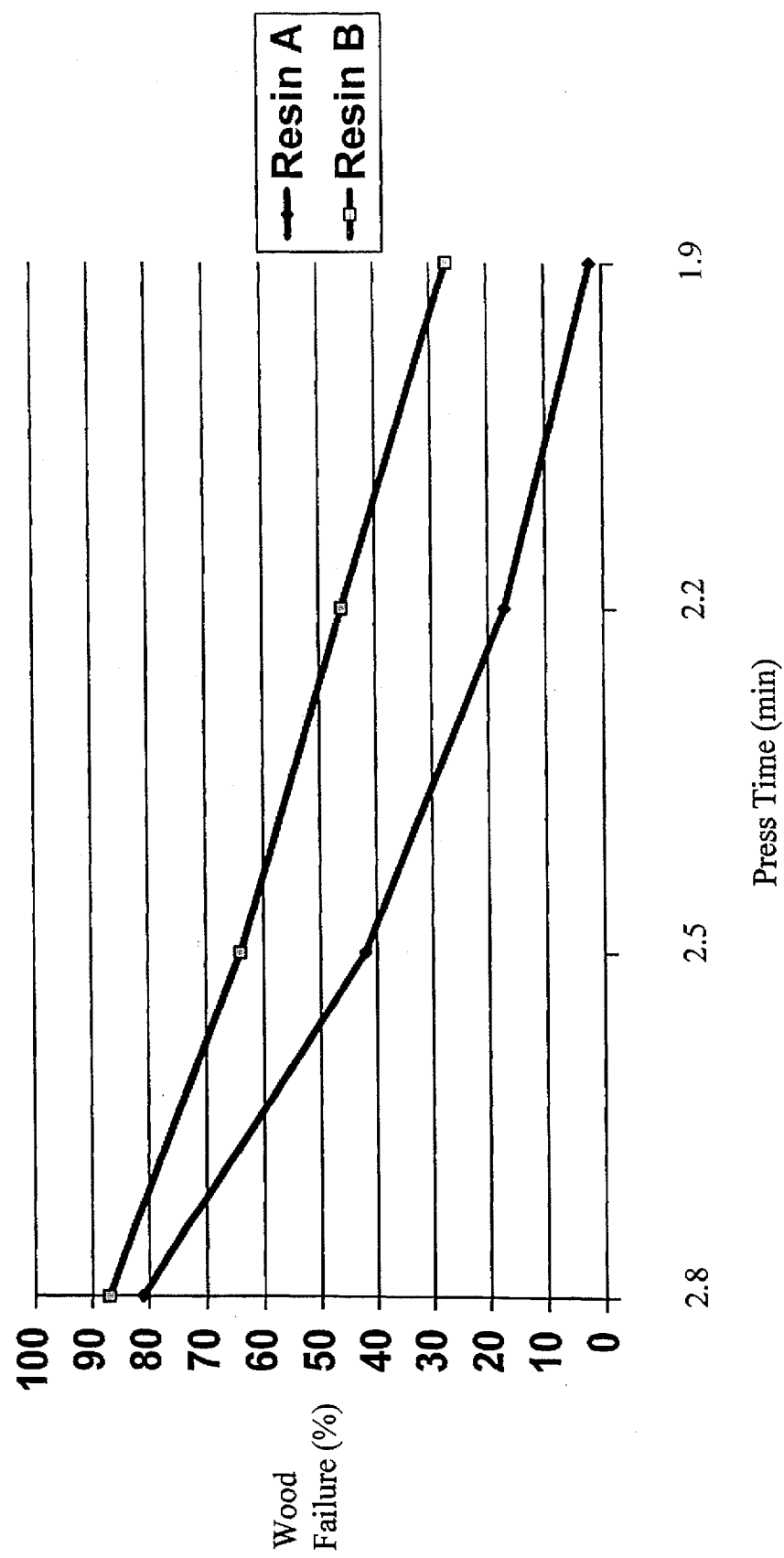
FIG. 2 depicts high moisture content veneer press time study results.

The high moisture veneer study results are shown in Table 6 and FIG. 2.

TABLE 6

Results for the High Moisture Study

| | Press Time | | | | | Average Wood Failure Results | 95% Interval Range | |
|---|---|---|---|---|---|---|---|---|
| Resin | 1.9 | 2.2 | 2.5 | 2.8 | Average | Lower Limit | Upper Limit |
| A | 2 | 17 | 42 | 81 | 35 | 29 | 42 |
| B | 27 | 46 | 64 | 87 | 55 | 49 | 62 |

Press times were identical to the time used for the press speed study to indicate the adhesives ability to bond veneer with a wide moisture profile. The 2.3 mole ratio resin (Resin B) performed significantly better at bonding the higher moisture profile veneer than Resin A as determined by wood failure values. At the lowest press time, Resin B showed wood failure on the glue line whereas Resin A failed to deliver any bonding. There is a wider tolerance for veneer moisture content differences for Resin B.

Figure 3:
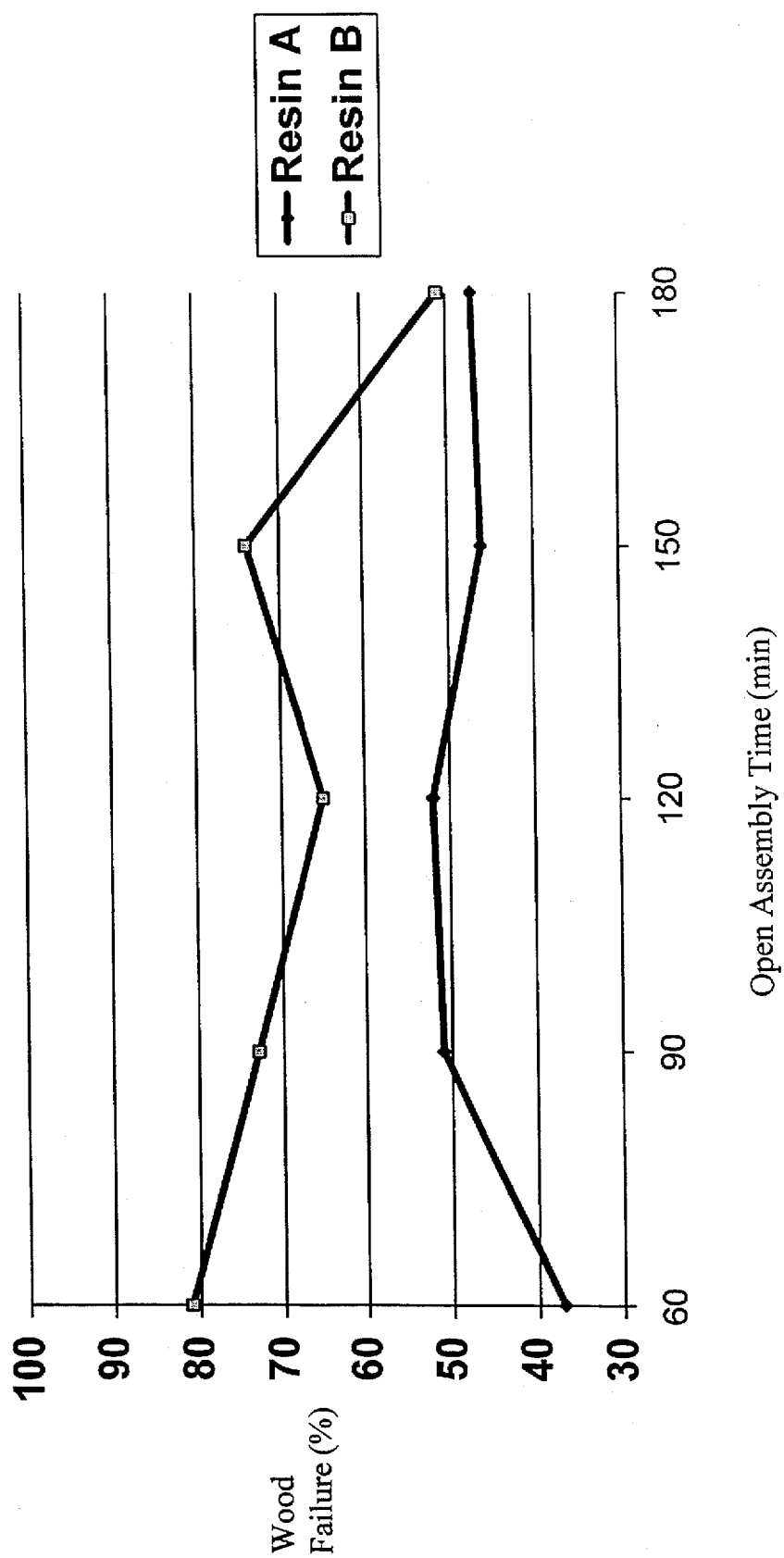
FIG. 3 depicts dry out study results.

Dry out resistance for the two resins was determined by an open assembly time study and the results from this study are listed in Table 7 and shown in FIG. 3.

TABLE 7

Results for the Open Assembly Time Study

| | Open Assembly Times (min) | | | | | Average Wood Failure Results | 95% Interval Range | |
|---|---|---|---|---|---|---|---|---|
| Resin | 180 | 150 | 120 | 90 | 60 | Average | Lower Limit | Upper Limit |
| A | 47 | 46 | 52 | 51 | 37 | 47 | 42 | 51 |
| B | 51 | 74 | 65 | 73 | 81 | 69 | 65 | 73 |

The two resins were found to be statistically different from each other by examination of wood failure results over all five open assembly times used. Resin B was statistically superior to Resin A.

The high moisture veneer study clearly demonstrates the ability of the 2.3 mole ratio guanidine-modified resin (Resin B) to bind veneer surfaces faster than the commercially available resin (Resin A) despite the additive which enhances the speed of Resin A. The better dry out resistance of the guanidine carbonate-modified 2.3 mole ratio resins vs. Resin A was not expected.

Example 3

Two guanidine carbonate containing resins were prepared using 2.0:1 and 2.2:1 formaldehyde to phenol mole ratios. A summary of the preparation for the 2.2 mole ratio resin is shown below. The 2.0 mole ration version was prepared similarly.

Resin Ingredients

| Component | Weight % |
|---|---|
| Phenol | 25 |
| 50% $CH_2O$ | 13 |
| Water | 27 |
| Pearl Starch | 0.4 |
| 50% NaOH | 6 |
| 50% $CH_2O$ | 22 |
| Guanidine Carbonate | 1 |
| 50% NaOH | 6 |

Phenol, formaldehyde, water and starch were charged to a reactor and the temperature was adjusted to 37° C. Sodium hydroxide solution was added and the temperature was allowed to increase to 82° C. The second charge of formaldehyde was added incrementally, keeping the reaction from getting too exothermic. Guanidine carbonate was then charged to the reactor. The reaction contents were then heated to 96° C. and held at that temperature for 10 minutes. The contents were cooled to 82° C. and reacted to 700–800 cps as measured on a Brookfield viscometer (model LVF). During the viscosity hold to 700–800 cps the remaining caustic was added incrementally. The resulting product contained 42.6% solids.

Example 4

Two guanidine carbonate modified resins were prepared and examined for their ability to bond high moisture content veneer, and for their resistance to drying out during varying open assembly times. Resin E (control) is a commercially available intermediate moisture content adhesive G-P RPPY 5763 with a 2.2:1 F/P mole ratio. Resin F (control) was a resin prepared similarly to 5763 with a 2.0:1 F/P mole ratio. Resin G was the 2.2:1 F/P mole ratio resin prepared as described in Example 3. Resin H was the 2.0:1 F/P mole ratio resin prepared similarly to Resin G. Resins G and H were modified with 1.0 wt % of guanidine carbonate.

TABLE 8

Properties for the Resins

| Resin | % Caustic | Viscosity (cps) | RI | % NVS | Free Formaldehyde |
|---|---|---|---|---|---|
| E | 6.00 | 736 | 1.462 | 43.49 | 0.06 |
| F | 6.06 | 772 | 1.4621 | 42.99 | 0 |
| G | 6.21 | 800 | 1.4593 | 42.62 | 0 |
| H | 6.41 | 680 | 1.461 | 42.36 | 0 |

TABLE 9

| GPC Results for the Resins | | | |
|---|---|---|---|
| Resin | $M_n$ | $M_w$ | $M_z$ |
| E | 374 | 1041 | 2137 |
| F | 372 | 1084 | 2261 |
| G | 370 | 1034 | 2121 |
| H | 352 | 940 | 1912 |

The advantages of advancement and viscosity noted in Example 2 were not evident when this lower level of guanidine carbonate (1%) was used.

The resins were incorporated into the same RESI-MAX® formulation listed in Table 3 from Example 2. The mixes were aged overnight and used in a high moisture and dry out study similar to those described in Table 4, Example 2 with the following exceptions. For the dry out study the open assembly times examined were 0, 10, 30, 60 and 120 minutes. For the high moisture study the face/back average moisture content of the veneer was 9–11% and the hot press times were 2.4, 2.8, 3.2 and 3.6 minutes.

Figure 4:
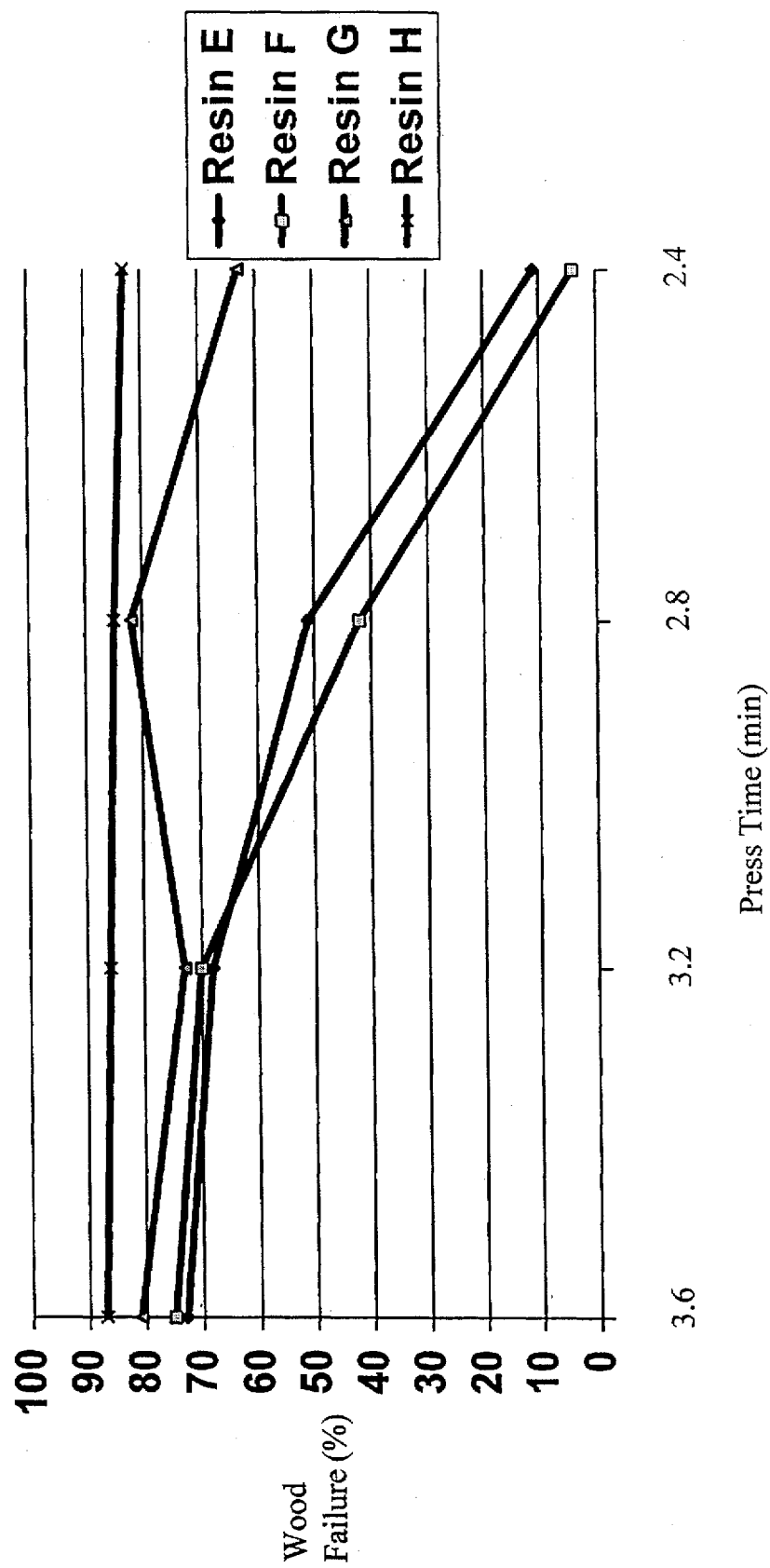
FIG. 4 depicts high moisture content veneer press time study results.

Results for the high moisture study are listed in Table 10 and detailed in FIG. 4.

TABLE 10

| Results of the High Moisture Study | | | | | | |
|---|---|---|---|---|---|---|
| | | | | | Average Wood Failure Results | |
| | | | | | | 95% Interval Range |
| | Press Time | | | | Lower | Upper |
| Resin | 2.4 | 2.8 | 3.2 | 3.6 | Average | Limit | Limit |
| E | 11 | 51 | 68 | 73 | 51 | 45 | 57 |
| F | 4 | 42 | 70 | 75 | 46 | 40 | 53 |
| G | 63 | 82 | 73 | 81 | 74 | 68 | 81 |
| H | 83 | 85 | 86 | 87 | 85 | 79 | 91 |

Both guanidine carbonate modified resins bonded the 10% MC veneer significantly better than both commercially available resin E and the F/P mole ratio adjusted resin F as determined by wood failure values. Remarkably, resin H maintained APA acceptable wood failure values of >80% over all conditions used, including the two lowest press times where the commercially available adhesive had several panels "blow" apart.

Figure 5:
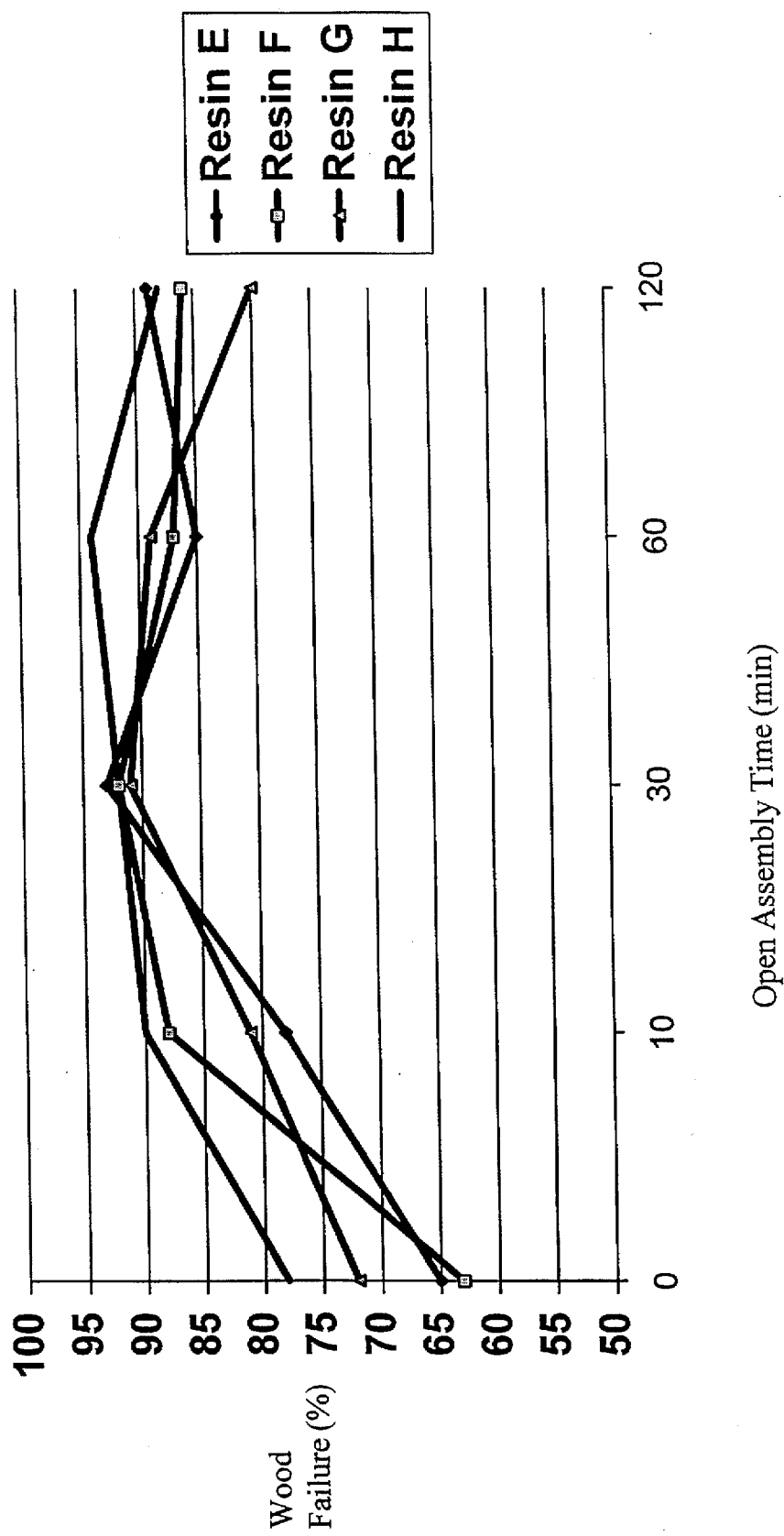
FIG. 5 depicts dry out study results.

Dry out resistance for the four resins was determined using an open assembly time study and the results can be found in Table 11 and are shown graphically in FIG. 5.

TABLE 11

| Results for the Open Assembly Time Study | | | | | |
|---|---|---|---|---|---|
| | Open Assembly Times (min) | | | | |
| Resin | 120 | 60 | 30 | 10 | 0 |
| E | 89 | 85 | 93 | 78 | 65 |
| F | 86 | 87 | 92 | 88 | 63 |
| G | 80 | 89 | 91 | 81 | 72 |
| H | 88 | 94 | 92 | 90 | 78 |

Resin H was found to be statistically superior to the other resins at resisting glue line dry out in addition to its superior performance for bonding high moisture content veneer. Therefore, the advantage shown by the guanidine carbonate modified resins in the high moisture study did not come at the expense of glue line dry out when varying assembly times were examined.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. In a method for preparing a phenol-formaldehyde resole resin wherein formaldehyde and phenol are reacted at a formaldehyde to phenol mole ratio above about 1.5:1, in the presence of an effective amount of an alkaline catalyst, the improvement comprising introducing a catalytic amount of a guanidine salt during the preparation of the resin.

2. The method of claim 1 wherein the guanidine salt is selected from the group consisting of guanidine carbonate, guanidine hydrochloride, guanidine sulfate, and low molecular weight guanidine adducts with formaldehyde.

3. The method of claim 2 wherein the guanidine salt is guanidine carbonate.

4. The method of claim 1 further comprising introducing the guanidine salt in an amount of 0.02 to 12 wt % based on the total weight of the resin solids.

5. The method of claim 1 wherein the formaldehyde to phenol ratio is between about 1.5:1 and 2.5:1.

6. The method of claim 1 wherein the effective amount of alkaline catalyst establishes a pH between about 9 and 12.

7. The method of claim 1 wherein the guanidine salt is introduced after substantially all of the formaldehyde has reacted with the phenol.

8. An improved phenol-formaldehyde resole resin composition prepared by reacting formaldehyde and phenol at a formaldehyde to phenol mole ratio above about 1.5:1, in the presence of an effective amount of an alkaline catalyst, wherein the improvement comprises introducing a catalytic amount of a guanidine salt into the composition during the preparation of the resin.

9. The resin of claim 8 wherein the guanidine salt is selected from the group consisting of guanidine carbonate, guanidine hydrochloride, guanidine sulfate, and low molecular weight guanidine adducts with formaldehyde.

10. The resin of claim 9 the guanidine salt is guanidine carbonate.

11. The resin of claim 8 wherein the guanidine salt is introduced in an amount of 0.02 to 12 wt % based on the total weight of the resin solids.

12. The resin of claim 8 wherein the formaldehyde to phenol ratio is between about 1.5:1 and 2.5:1.

13. The resin of claim 8 wherein the guanidine salt is introduced after substantially all of the formaldehyde has reacted with the phenol.

14. In a method for making a bonded wood product comprising (i) applying to a substrate an adhesive and (ii) hot pressing the substrate, whereby the adhesive comprises a resin prepared by reacting formaldehyde and phenol at a formaldehyde to phenol mole ratio above about 1.5:1, in the presence of an effective amount of an alkaline catalyst, the improvement comprising introducing a catalytic amount of a guanidine salt during the preparation of the resin.

15. The method of claim 14, wherein the substrate is veneer or wood strand.

16. The method of claim 14, wherein the bonded wood product is plywood or oriented strand board (OSB).

17. The method of claim 14 wherein the guanidine salt is selected from the group consisting of guanidine carbonate, guanidine hydrochloride, guanidine sulfate, and low molecular weight guanidine adducts with formaldehyde.

18. The method of claim 17 wherein the guanidine salt is guanidine carbonate.

19. The method of claim 14 further comprising introducing the guanidine salt in an amount of 0.02 to 12 wt % based on the total weight of the resin solids.

20. A bonded wood product prepared by (i) applying to a substrate an adhesive and (ii) hot pressing the substrate, wherein the adhesive comprises a resin prepared by reacting formaldehyde and phenol at a formaldehyde to phenol mole ratio above about 1.5:1, in the presence of an effective amount of an alkaline catalyst, the improvement comprising introducing a catalytic amount of a guanidine salt during the preparation of the resin.

21. The product of claim 20, wherein the substrate is veneer or wood strand.

22. The product of claim 20, wherein the bonded wood product is plywood or oriented strand board (OSB).

23. The product of claim 20 wherein the guanidine salt is selected from the group consisting of guanidine carbonate, guanidine hydrochloride, guanidine sulfate, and low molecular weight guanidine adducts with formaldehyde.

24. The product of claim 23 wherein the guanidine salt is guanidine carbonate.

25. The product of claim 20 further comprising introducing the guanidine salt in an amount of 0.02 to 12 wt % based on the total weight of the resin solids.

\* \* \* \* \*